United States Patent [19]

Saito et al.

[11] Patent Number: 5,114,663

[45] Date of Patent: May 19, 1992

[54] ELECTROMAGNET FOR NUCLEAR REACTOR SHUTDOWN SYSTEM

[75] Inventors: Makoto Saito; Minoru Gunji, both of Mito, Japan

[73] Assignee: Doryokuro Kakunenryo Kaihatsu Jigyodan, Tokyo, Japan

[21] Appl. No.: 740,616

[22] Filed: Aug. 5, 1991

[30] Foreign Application Priority Data

Aug. 16, 1990 [JP] Japan .................................. 2-216332

[51] Int. Cl.$^5$ .............................................. G21C 9/02
[52] U.S. Cl. ..................................... 376/233; 376/336; 403/32; 403/DIG. 1; 335/146; 335/217
[58] Field of Search ............... 376/336, 337, 228, 233; 335/208, 146, 217; 192/82 T; 403/DIG. 1, 32, 28, 2

[56] References Cited

U.S. PATENT DOCUMENTS

| | | | |
|---|---|---|---|
| 3,976,540 | 8/1976 | Sowa | 376/336 |
| 4,233,115 | 11/1980 | Jacquelin | 376/233 |
| 4,304,632 | 12/1981 | Bhate et al. | 376/336 |
| 4,405,558 | 9/1983 | Mangus et al. | 376/233 |

Primary Examiner—Brooks H. Hunt
Assistant Examiner—Chrisman D. Carroll
Attorney, Agent, or Firm—Wenderoth, Lind & Ponack

[57] ABSTRACT

An electromagnet for a nuclear reactor shutdown system, which comprises upper and lower cores disposed in an axially symmetrical arrangement and capable of latching with and delatching from each other. When an ambient temperature increases, the upper and lower iron cores are delatched from each other and a control rod connected to the lower iron core falls down into a reactor core. The lower iron core is provided with a plurality of slits to form a plurality of fins therebetween. A temperature sensitive magnetic material (TSMM) is disposed in the outer circumferential lower corner portion of the lower iron core. An interface between the TSMM and an iron core material takes the form of a side surface of a cone whose central axis is coincident with the symmetry axis and whose apex angle lies in the range of 60° to 120°.

2 Claims, 7 Drawing Sheets

ELECTROMAGNET FOR NUCLEAR REACTOR SHUTDOWN SYSTEM

BACKGROUND OF THE INVENTION

The present invention relates to a temperature sensitive electromagnet (TSEM) for automatically inserting a retained control rod into a reactor core without any external control to effect emergency shutdown of the reactor when the temperature in the reactor rises in an extraordinary manner.

A fast breeder reactor is provided with a system for inserting the control rod into the reactor core when anything unusual occurs. As such a reactor shutdown system, there has been proposed a system for retaining and separating the the control rod by using an electromagnet, the magnetic force of which varies depending upon its ambient temperature. FIGS. 8 and 9 illustrate a concept of such a system.

An electromagnet 10 is provided with upper and lower iron cores 12, 14 capable of latching with and delatching from each other, and a coil 16 wound around the upper iron core 12. A temperature sensitive magnetic material (TSMM) 18 having a suitable Curie-point is incorporated in a part of the lower iron core 14. The upper iron core 12 is suspended from a control rod driving unit 20, and a control rod 22 is connected to the lower iron core 14. When the ambient temperature of the electromagnetic 10 exceeds the Curie-point of the TSMM 18, this TSMM 18 turns to non-magnetic, so that the magnetic resistance of the magnetic circuit becomes high. Consequently, the magnetic force decreases even when an electric current continues to be supplied to the coil 16. Accordingly, even if any external command is not given, the control rod 22 falls to be inserted into a reactor core 24.

This system is called a self-actuated reactor shutdown system, which is considered to be very much reliable in that it does not require processes, which are necessary for a prior art shutdown system, of monitoring conditions of the interior of the nuclear reactor and of issuing a command to insert the control rod into the reactor core when an abnormality is detected.

The principle of operation of the above-described system is simple, and the characteristics thereof have already been ascertained. However, application of this principle to an actual nuclear reactor has some problems. First, an electromagnet is disposed in an existing control rod guide tube, and, therefore, it is restricted severely with respect to the dimensions (90 mm in diameter in the case of, for example, a 1,000,000-kW class fast breeder reactor). It is necessary that a sufficiently large magnetic force in comparison with the weight of the control rod be secured under such dimensionally restricted conditions. Theoretically speaking, the electromagnet may have a magnetic force exceeding the weight of the control rod. However, if a margin of the magnetic force is insufficient, it is highly possible that the electromagnet erroneously actuates due to even a small-scale earthquake or the vibration of a fluid occurring during a normal operation of the reactor. This is a great disadvantage in operation of a plant.

On the other hand, in order to delatch the control rod, it is necessary that the magnetic force decreases sufficiently with respect to the weight of the control rod when the ambient temperature of the electromagnet is above the Curie-point of the TSMM. Unlike the electricity, the magnetism has a certain level of magnetization even in a space. Accordingly, even when the TSMM has become non-magnetic, a certain level of the magnetic force basically remains therein. In order to minimize the residual magnetic force, the volume of the TSMM should be increased. However, if the TSMM is enlarged excessively, the magnetic resistance in the magnetic circuit increases, and the level of the magnetic force at a normal operation temperature of the reactor decreases since the saturation magnetization of the TSMM is generally lower than that of the iron core material (iron). Especially, the electromagnet in a nuclear reactor shutdown system is required to generate large magnetic force in a limited space. Therefore, at a normal operation temperature of the reactor, the electromagnet is used in a state that the magnetic flux density thereof is close to a saturation magnetic flux density of iron. Consequently, the magnetic resistance of the TSMM, that is, the keeping the area of the interface between the iron and TSMM becomes an important problem. Since the magnetic flux passes through the TSMM at a normal operation temperature of the reactor, the magnetic resistance thereof depends upon the cross-sectional area and length of the TSMM just like the electric resistance thereof. However, since the TSMM becomes non-magnetic at temperatures higher than its Curie-point, the magnetic flux passes through the space without respect to the TSMM. Accordingly, the magnetic resistance of the iron core as a whole above the Curie-point is determined depending upon the shape of the iron core except the TSMM. Therefore, in order to cause the TSMM to exhibit excellent magnetic characteristics, it is necessary that the shape and the location of the TSMM must be carefully designed.

FIG. 10 shows an example (design example 1) of a lower iron core of an electromagnet. A TSMM 18a is disposed in the lower corner of the outer circumferential portion of the lower iron core, and slits 26a are provided for the purpose of improving the temperature response. In this structure, the area of the interface $F_1$ of an iron core material 28a and the TSMM 18a in the outer circumferential side is secured by extending the interface $F_1$ in the inward direction (to form an extension f of the interface). As a result, at a normal operation temperature, holding force the value of which is about three times as high as that of the weight of a control rod is obtained. When the TSMM has become non-magnetic at an ambient temperature above the Curie-point of the TSMM, the value of residual magnetic force becomes about 1/6 of that of the weight of the control rod, since the interface $F_1$ is perpendicular to the central iron core to cause the TSMM and the central iron core to be apart from each other effectively. Consequently, sufficiently good magnetic force characteristic for the nuclear reactor shutdown system is obtained.

In addition to the excellent magnetic force characteristics, the electromagnet is required to have excellent temperature response such that the magnetic force rapidly lowers to delatch the control rod quickly when the ambient temperature exceeds the Curie-point. It is demanded in a fast breeder reactor that the self-actuated shutdown system actuates within delay time of about 2 or 3 seconds under the severest condition. In the above-mentioned design example 1, the temperature response is not so good. The reason resides in that, since a sufficiently large area of the interface between the iron core material and the TSMM has to be secured, deep slits cannot be formed, so that the inner portion without slits which has poor temperature response remains in the TSMM. In general, the temperature of fins 27a sandwiched by the slits 26a responds rapidly (temperature response is excellent) with respect to the change of the ambient temperature, but the temperature response of the inner TSMM portion without slits is very poor. The result of a magnetic field analysis shows that, assuming that the temperature of only fins 27a that have excellent temperature response exceeds the Curie-point, the level of the magnetic force of the electromagnet does not become lower than the weight of the control rod, which means that the temperature of some part of the inner TSMM portion without slits has to exceed the Curie-point to get sufficient reduction of the magnetic force. Further, the result of a thermal analysis shows that it takes not less than 6 seconds to reduce the magnetic force to the level required for the actuation of the electromagnet, even on the assumption that coolant flows ideally into the slits 26a.

Generally speaking, in order to improve the temperature response, the TSMM as a whole may be composed of a fin structure. However, such a structure means a fin structure wherein the area through which magnetic flux passes decreases to cause a shortage of magnetic force. Especially, since the saturation magnetization of the TSMM is lower than that of iron, the influence of such a fin structure appears distinctly. A shortage of the area of the interface between the iron core material and the TSMM causes the largest structural problem. A design example 2 shown in FIG. 11 has been devised so as to solve this problem. A TSMM 18b is sandwiched between inner and outer long iron core materials 28b, and the area of the interface $F_2$ is thereby secured. In this structure wherein slits 26b and fins 27b are formed in the whole of the TSMM, the excellent temperature response can be expected, but there is a drawback that the magnetic force remaining at a temperature above the Curie-point becomes large. The results of measurement of the holding force in the design example 2 and the design example 1 are shown in Table 1.

TABLE 1

| Electromagnet structure | Magnetic force during a normal operation | Residual magnetic force at a temperature above the Curie-point |
| --- | --- | --- |
| Design example 1 | 217 Kg | 10 Kg |
| Design example 2 | 130 Kg | 30 Kg |

As is apparent from Table 1, the ratio of the residual magnetic force to the holding force of the design example 2 becomes markedly higher than that in the design example 1. Incidentally, in order to obtain holding force the level of which is equal to that of the holding force in the design example 1, it is necessary in the design example 2 to supply a larger electric current to the coil. Consequently, the residual magnetic force becomes 60 kg which is equal to the weight of the control rod. Therefore, even when the ambient temperature exceeds the Curie-point, the delatching of the control rod becomes difficult. The reason resides in that, since the surface area between inner and outer iron core members is large, magnetic flux flowing through the surface between these iron core members becomes large even when the TSMM becomes non-magnetic at a temperature above the Curie-point. The retention and separation of the control rod is theoretically possible by the magnetic force in the design example 2 but the margin of the magnetic force in the design example 2 is small as compared with that in the design example 1. Therefore, the possibility of occurrence of spurious shutdown in normal operation of the reactor is large. In the design example 2, the magnetic force characteristics is sacrificed to improve the temperature response.

In order to prevent spurious shutdown (fall of the control rod) due to vibration during normal operation, a unique vibration absorbing mechanism has been developed. It has been ascertained that magnetic force of about 130 Kg which is two times as large as the weight of the control rod is sufficient to prevent spurious shutdown even if severer earthquake of S2-class occurs. However, in view of the condition in an actual nuclear reactor plant, it is preferable that, in the initial condition, the electromagnet has magnetic force of a level which is, with additional margin, at least about 160 Kg, i.e. at least 2.5 times as high as that of the weight of the control rod.

Regarding the temperature response, the following conditions are assumed as the severest requirements in a large-scale fast breeder reactor in which introduction of the reactor shutdown system has strongly been demanded. Namely, when the temperature of the coolant around the electromagnet increases 30° C./sec, the delay time in actuation of the electromagnet should be less than 3 seconds. The rate of increase of temperature referred to above is determined on the assumption that an accident of coolant flow rate shortage and a failure of reactor shutdown by a conventional shutdown system occur concurrently, which represents the most rapid temperature increase in accidents. The delay time in actuation means the time between an instant at which the temperature of the coolant around the electromagnet reaches a predetermined operating temperature (operating temperature in a case where the temperature of the coolant increases at a slow rate) and an instant at which the electromagnet actuates in practice. The temperature response of the electromagnet is evaluated on the basis of this delay time in actuation.

As described above, in the electromagnets based on the design examples 1 or 2, either the holding force or the temperature response is sacrificed, so that the severest conditions for an electromagnet in a large-scale fast breeder reactor which demands both of these characteristic could not be satisfied.

SUMMARY OF THE INVENTION

An object of the present invention is to provide an electromagnet for a nuclear reactor shutdown system which is capable of satisfying the required characteristics, i.e. both the holding force and the temperature response.

Another object of the present invention is to provide an electromagnet for nuclear reactor shutdown system which has an easily designable structure so as to exhibit a desired performance even when different kind of TSMM is employed.

According to the present invention, there is provided an improvement in an electromagnet for a nuclear reactor shutdown system. The electromagnet has an upper iron core and a lower iron core disposed in an axially symmetrical arrangement and capable of latching with and delatching from each other, and a coil wound around the upper iron core. The lower iron core is provided at an outer circumferential portion thereof with a plurality of slits to form a plurality of fins between the slits. A part of the lower iron core is composed of a TSMM having a Curie-point lower than that of a material of the iron cores. The upper and lower iron cores are delatched from each other when an ambient temperature increases so as to separate a control rod connected to the lower iron core.

The improvement according to the present invention resides in the structure of the lower iron core. Namely, as shown in FIGS. 1A and 1B, the TSMM 32 is disposed in the outer circumferential lower corner portion of the lower iron core 30. An interface F between the TSMM 32 and an outer iron core material 34 in the outer circumferential portion of the lower iron core 30 takes the form of a side surface of a cone whose central axis c—c is coincident with the symmetry axis. The apex angle $\theta$ of the cone lies in the range of 60° to 120°. A reference numeral 35 denotes an inner iron core material. The outer circumferential portion of the lower iron core 30, i.e. the TSMM 32 and a part of the outer iron core material 34 in contact with this TSMM 32 form a fin structure. It is preferable that this fin structure has a maximum thickness of each fin of not less than 4 mm and not more than 8 mm and a width of each slit 36 between adjacent fins of not less than 2 mm and not more than 4 mm, and has the slits 36 formed as deep as possible in the TSMM 32 to form this material 32 as a whole into a fin structure. The perspective view of FIG. 1A is drawn with the slits omitted, so as to prevent the drawing from being complicated.

Such a structure has been derived from the result of experiments shown below. First, the shape of the fins is determined in view of the necessity of securing proper temperature response. In the case of the present invention, the severest level which is assumed for a large-scale fast breeder reactor is employed as a target level of temperature response. Namely, this level represents the temperature response of an electromagnet in which the electromagnet actuates with a time delay of not more than 2 seconds when the temperature of the coolant increases at a rate of 30° C./sec in an assumed case where an accident of loss of coolant flow occurs. The designing of this structure was made on the premise that the required magnetic force characteristic is obtained in accordance with the temperature change of the fins alone, and the thickness of the fins was determined on the basis of the result of a heat conduction analysis. A simple theory of heat conduction suggests that, in order to attain the target level, the thickness of each fin must be not more than 8 mm. A lower limit thickness of the fin is determined from the point of coolant flow in the slit. If the thickness of the fin has become excessively small, the number of the fins increases. This causes the slits to be narrowed, and the quantity of sodium flow into the slits disadvantageously decreases. The practical thickness of the fin is determined in accordance with the required holding force and the saturation magnetization of the TSMM. If a lower limit level of 2 mm of the width of each slit, which is determined in accordance with the following procedures, is employed under the conditions shown in Table 2, which are determined on the assumption that the electromagnet is used in a 1,000,000 kW-class fast breeder reactor, the thickness of each fin comes to about 4 mm.

TABLE 2

| Maximum outer diameter of electromagnet | 90 mm |
|---|---|
| Holding force of electromagnet | 150 Kg |
| Saturation magnetization of TSMM | 0.7 tesla |
| Temperature response | 2 sec |
| Coolant | sodium |
| Range of temperature of coolant | 500°–600° C. |

The lower limit level of the width of the slit is determined so that it allows the coolant to flow sufficiently into the slits. The flow rate of the coolant in the slits vary depending upon the depth and height of the slits as well as the viscosity of the coolant. Accordingly, the quantity of heat transfer from the sodium which flows into the slits to the fins was evaluated on the basis of the conditions shown in Table 2, and the width of each slit was then set to not less than 2 mm (refer to FIG. 2). An upper limit level of the width of each slit is determined in view of the necessity of securing the effective cross-sectional area of the fin, and varies with the required holding force and the saturation magnetization of the TSMM. It is about 4 mm in the case where the maximum thickness of the fin is 8 mm.

The area of the interface between the iron core material and the TSMM is determined to obtain the required magnetic force. Interfacial area can be determined by selecting suitable apex angle of the cone. The largest obstacle to the magnetic force of the electromagnet is the magnetic resistance of the portion thereof which consists of a TSMM. This is because the saturation magnetization of the TSMM is lower than that of the iron core material and the cross-sectional area of the TSMM is smaller than that of the iron core material due to the formation of the slits. Since the TSMM is selected on the basis of the Curie-point at which the electromagnet is expected to actuate, the saturation magnetization is determined inevitably by the TSMM to be employed. After the thickness of the fins of the TSMM is determined in view of the requirement for attaining a good temperature response, the remaining factor to determine the magnetic resistance is the area of the interface between the iron core material and the TSMM. Since the interface is formed conically according to the present invention, the area thereof can be adjusted by varying the apex angle of the cone. When the apex angle is as large as nearly 180°, an increase of the interface area is small in comparison with the area of the interface formed horizontally in the design example 1, in which the effect in employing the conical interface system is small. The present invention employs an apex angle of 120° as an upper limit level, at which a comparatively noticeable increase of not less than 15% of interface is obtained (refer to FIG. 3). Conversely when the apex angle is excessively small, the area of the interface increases, so that, when the TSMM has become non-magnetic at a temperature above the Curie-point, the residual magnetic force is strong as in the design example 2. According to a result of a magnetic field analysis, the residual magnetic force increases rapidly when the apex angle is not more than 60° as shown in FIG. 4. Therefore, the lower limit of apex angle is determined as 60°.

The area of the interface, between the TSMM and the iron core material can be adjusted by setting the apex angle of the cone to a suitable value, whereby the ratio of the residual magnetic force with respect to the magnetic force during a normal operation of the reactor can be balanced to a suitable level. At the same time, deep slits can be formed into the TSMM, which makes the quick response against temperature change possible.

PREFERRED EMBODIMENTS OF THE INVENTION

Figure 1A:
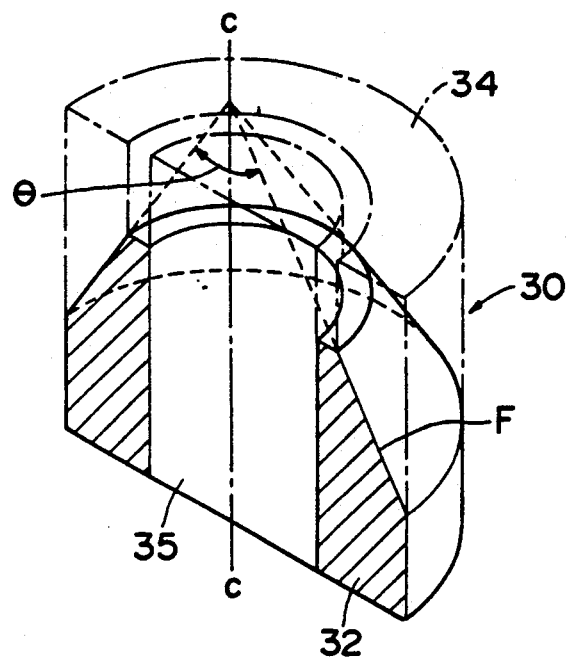
FIG. 1A is a perspective view illustrating the principle of the present invention.
Figure 1B:
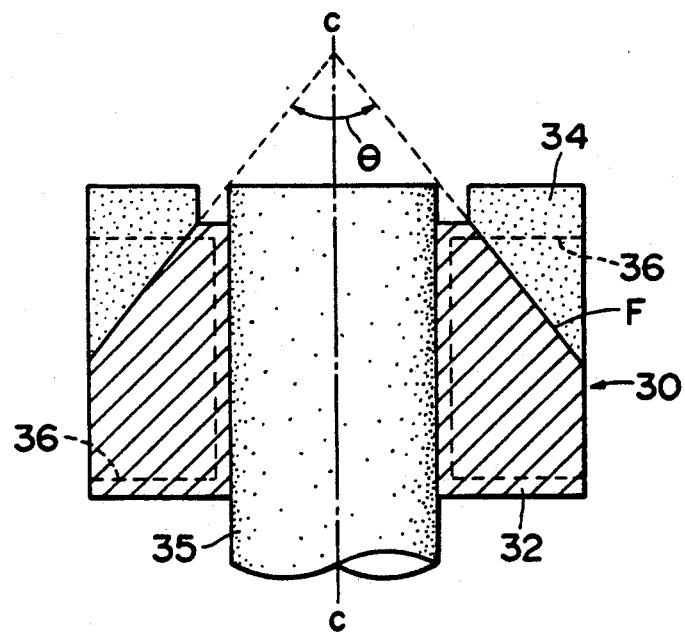
FIG. 1B is a sectional view of what is shown in FIG. 1A.
Figure 2:
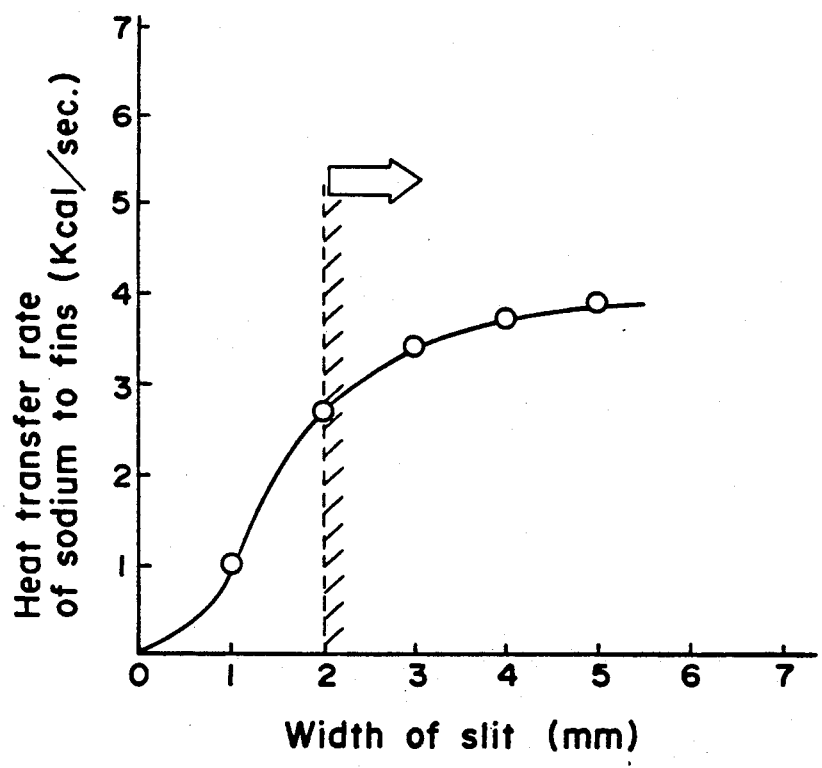
FIG. 2 is a graph showing the relation between the heat transfer rate of sodium to fins and the width of a slit.
Figure 3:
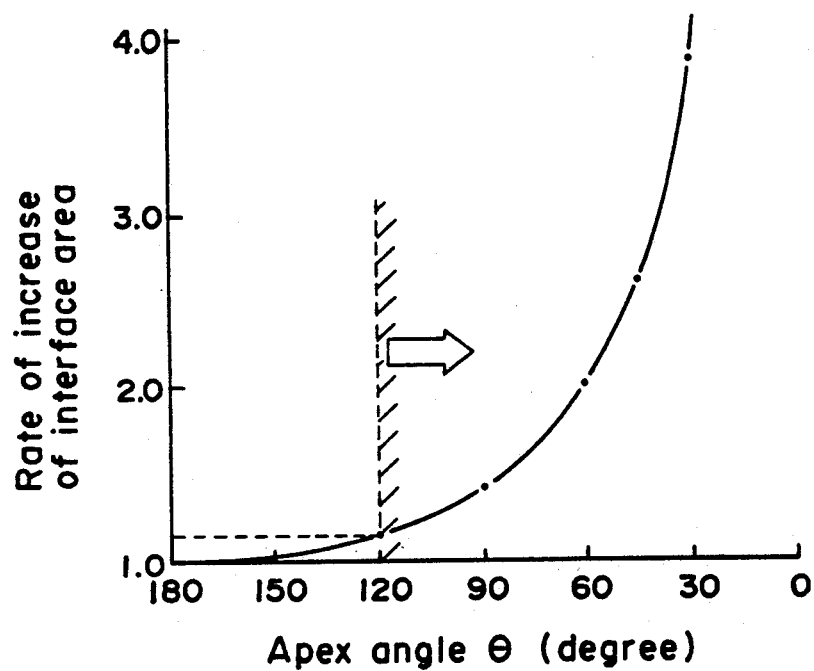
FIG. 3 is a graph showing the relation between the rate of increase of the interface area and the apex angle of a cone defining the interface.
Figure 4:
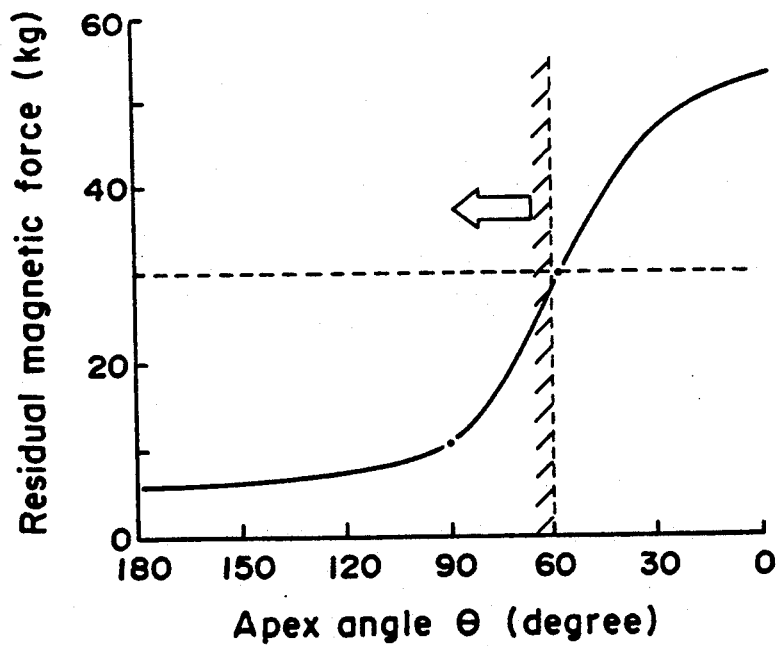
FIG. 4 is a graph showing the relation between the residual magnetic force and the apex angle of a cone defining the interface.
Figure 5:
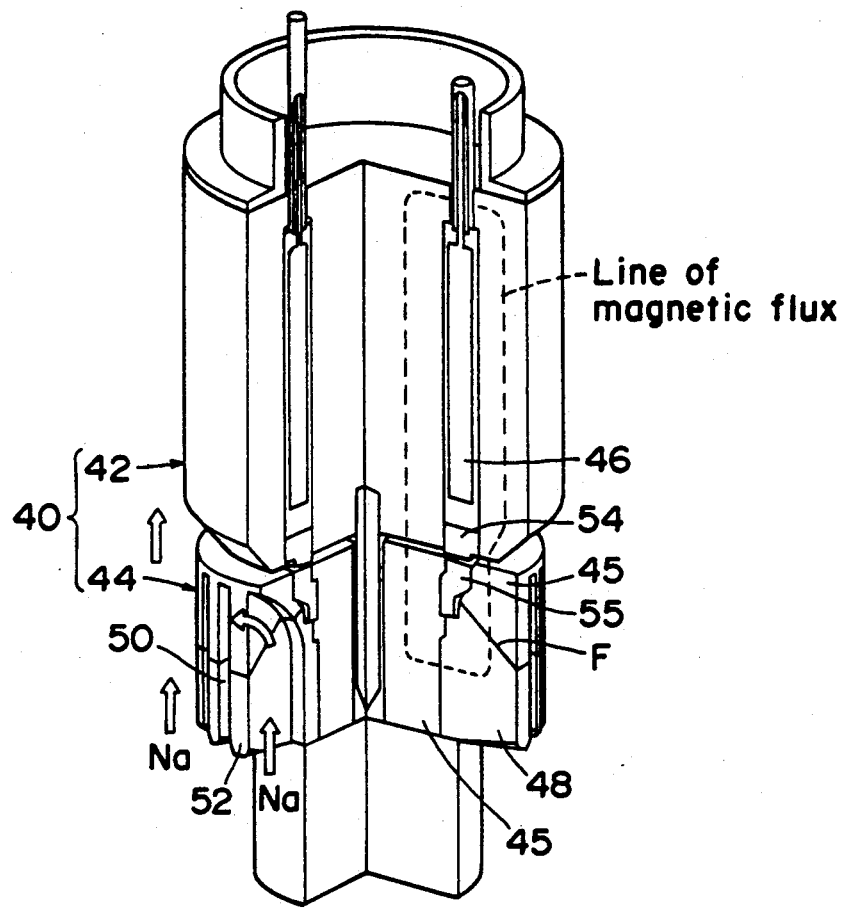
FIG. 5 is a partially sectional view in perspective of an embodiment of the present invention.
Figure 6:
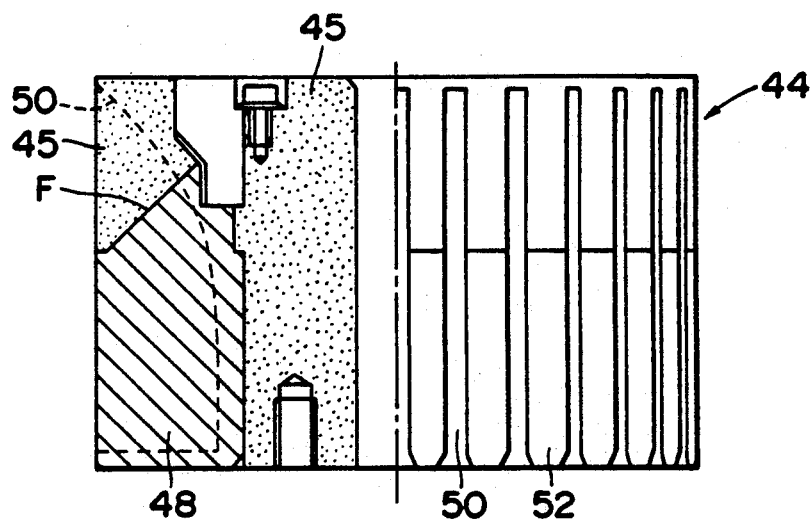
FIG. 6 illustrates the construction of a lower iron core in the embodiment.

FIGS. 5 and 6 show an example of an electromagnet for a nuclear reactor shutdown system which actuates at 480° C. The electromagnet 40 consists of upper and lower iron cores 42, 44 which can be latched with and delatched from each other. The upper iron core 42 is so formed that a central portion and an outer circumferential portion surrounding the central portion are connected together at an upper portion, and consists wholly of an iron core material, a coil 46 being provided in a wound state in a hollow space. The upper iron core 42 is suspended from a control rod driving unit (not shown). The lower iron core 44 is so formed that a central portion and an outer circumferential portion surrounding the central portion are connected together at a lower portion, and a TSMM 48 having a suitable Curie-point is disposed in an outer circumferential lower corner portion, the other portion consisting of an iron core material 45. An interface F, which is in the outer circumferential portion of the lower iron core 44, between the TSMM 48 and the iron core material 45 is formed so that it takes the shape of a side surface of a cone having an apex angle $\theta$. The outer circumferential portion, i.e. the TSMM 48 and the iron core material 45 in contact with this TSMM 48, is provided with a plurality of radially extending slits 50 to form a fin structure wherein a plurality of fins 52 are formed between the slits 50. A control rod (not shown) is suspended from the lower iron core 44. Metal members 54, 55 for preventing self-fusion are disposed in the opposed surfaces of the upper and lower iron cores 42, 44.

Figure 10:
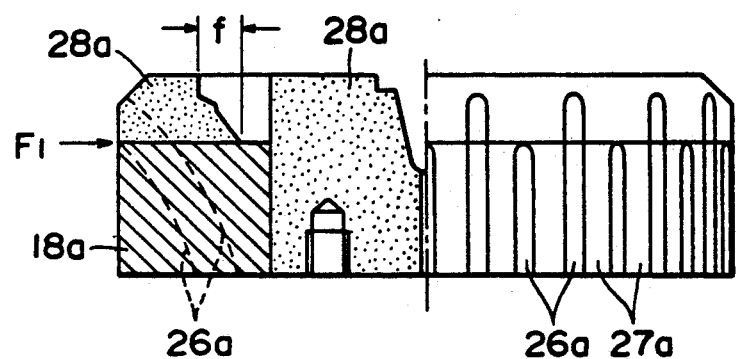
FIG. 10 is a structural diagram of a lower iron core of design, example 1.
Figure 11:
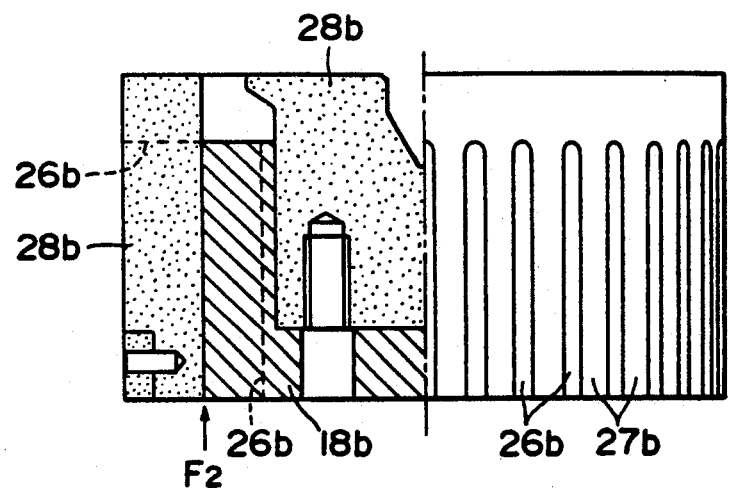
FIG. 11 is a structural diagram of a lower iron core of design example 2.

The TSMM 48 is FE-50% Ni alloy. The saturation magnetization of the TSMM at a normal operation temperature (430° C.) is about 0.7 tesla, which is about ½ of that of the iron core material (iron). Each fin 52 extends radially with the thickness thereof increasing gradually in the outward direction so that the thickness of the outermost portion thereof is 6 mm. The width of each slit is 3 mm, and such slits are formed deep in substantially the whole of the TSMM 48. The apex angle $\theta$ of a cone defining the interface F between the iron core material 45 and TSMM 48 is set to 90° on the basis of the results of a magnetic field analysis so that a magnetic force of about 3 times (about 195 Kg) as large as the weight of the control rod is obtained under the conditions shown in Table 2. Although the slits 50 are formed deep in substantially the whole of the TSMM 48, the interface area (area of a magnetic path) is sufficiently secured due to the conical interface. According to the result of a test, the magnetic force at a normal operation temperature was found to be 185 Kg which is about 2.8 times as large as the weight of the control rod, and that at 500° C. was found to be 10 kg which is not more than 1/6 of the weight of the same, this embodiment therefore being comparable to the design example 1 (FIG. 10) with respect to the magnetic force.

Figure 7:
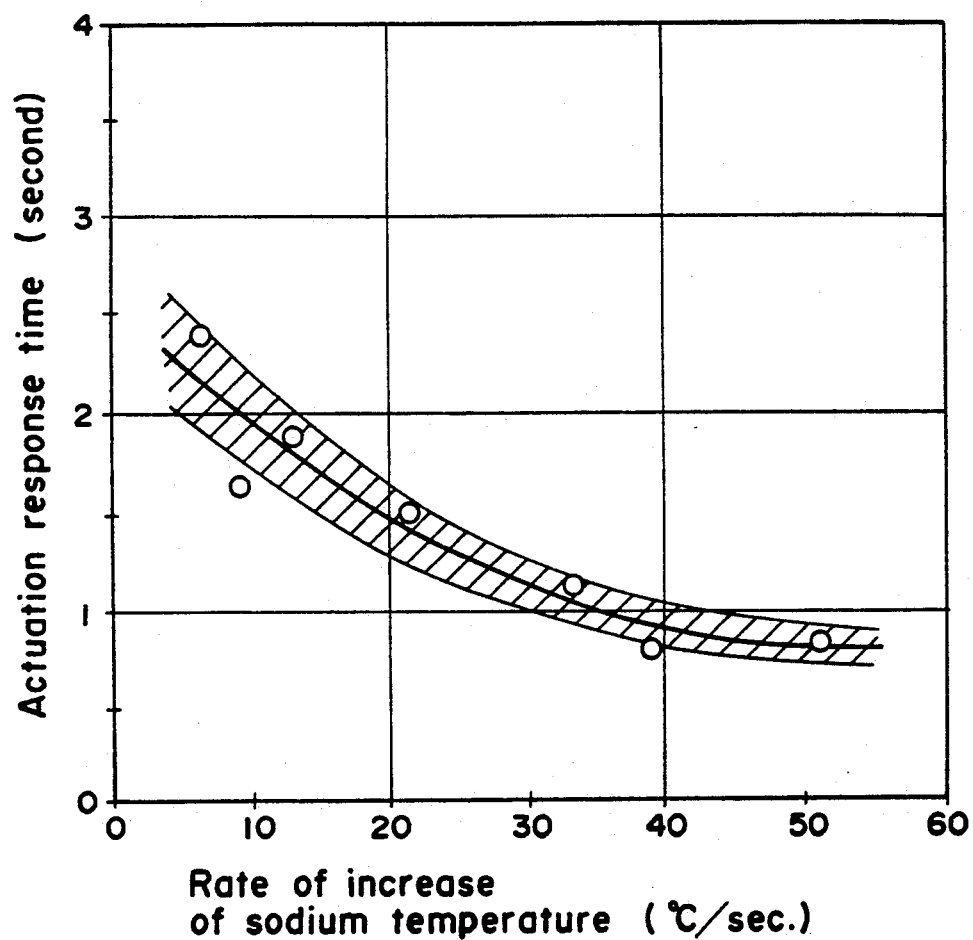
FIG. 7 is a graph showing the test result of temperature response.
Figure 8:
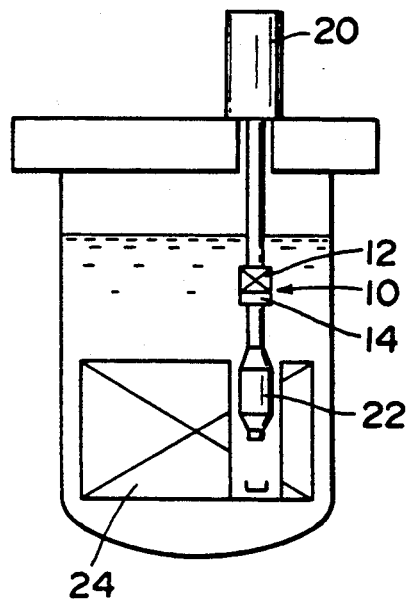
FIG. 8 is a conceptual diagram of a nuclear reactor shutdown system.
Figure 9:
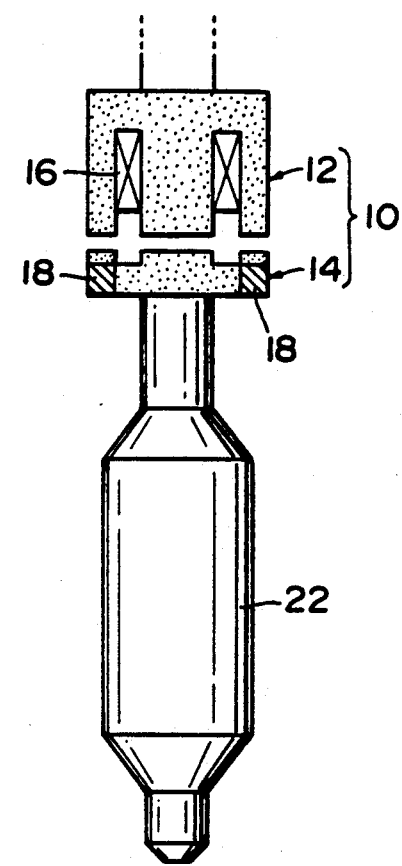
FIG. 9 is an enlarged view of a part of the system of FIG. 8.

The response to the temperature change of the electromagnet in the present embodiment was then ascertained by an analysis. Assuming that the temperature of the fin portion alone having excellent response exceeds the Curie-point, it was ascertained that the holding force decreased to about 35 Kg which is about ½ of the weight of the control rod, which indicates that the control rod can be delatched only by the temperature response of the fin portion. Actually, further reduction of the residual magnetic force could be expected, since the temperature of the surface of a small remaining TSMM portion without slits also increases to a certain extent. If the volume of the TSMM portion without slits is reduced a little further to decrease the net magnetic force by about 15 Kg, the magnetic force changes from 170 Kg to 20 Kg only by the change of temperature of the fin portion, and thus an electromagnet having well-balanced magnetic force characteristic is obtained. The temperature response of the electromagnet in the present embodiment were actually tested in sodium. In the test, the rate of temperature rise of 30° C./sec was given to the electromagnet to ascertain that the electromagnet actuated with a time delay shorter than 1.5 second (refer to FIG. 7). Referring to FIG. 7, a curve is an approximated one obtained by least squares analysis.

Above discussion shows that this electromagnet is comparable to the design example 1 (FIG. 10) with respect to the holding force and has markedly improved temperature response.

As is apparent from the foregoing, in the present invention, the interface between the TSMM incorporated in the iron core and the iron core material is formed so that it constitutes a part of the side surface of a cone. Therefore, the electromagnet according to the present invention enables the interface area to be large as compared with an electromagnet having a horizontal interface even when the radial distance of the former is equal to that of the latter. Moreover, the slits can be formed deep in the TSMM without causing an increase in the magnetic resistance in the magnetic circuit, so that the volume of the TSMM portion without slits can be minimized. This enables the actuation response of the electromagnet with respect to the change of the ambient temperature to be improved without sacrificing the magnetic force of the electromagnet.

For a Curie-point electromagnet for a nuclear reactor shutdown system, it is necessary that the TSMM is selected in accordance with the temperature at which the electromagnet is expected to actuate. Since different kinds of TSMM have different saturation magnetization, either the temperature response or the magnetic force is sacrificed in prior art systems when the saturation magnetization of the TSMM in use is low. However, according to the present invention, the area of the interface can be secured only by adjustment of the apex angle of a cone even when the saturation magnetization of the TSMM varies. Therefore, the same holding force and temperature response can be obtained. Accordingly, the designing of the electromagnet can be done easily, and the range of selection of the TSMM can be expanded.

What is claimed is:

1. An electromagnet for a nuclear reactor shutdown system having an upper iron core and a lower iron core disposed in an axially symmetrical arrangement and capable of latching with and delatching from each other, and a coil wound around said upper iron core, said lower iron core being provided at an outer circumferential portion thereof with a plurality of slits to form a plurality of fins between said slits, a part of said lower iron core being composed of a temperature sensitive magnetic material having a Curie-point lower than that of a material of said iron cores, said upper and lower iron cores being delatched from each other when an ambient temperature increases so as to separate a control rod connected to said lower iron core, characterized in that said temperature sensitive magnetic material is disposed in the outer circumferential lower corner portion of said lower iron core, with the upper surface of the temperature sensitive magnet material taking the form of an outer side surface of a cone whose central axis is coincident with said symmetry axis and whose apex angle lies in the range of 60° to 120° with the lower surface of the iron core material taking the form of an inner surface of a cone and interfacing with said upper surface of said temperature sensitive magnet material.

2. The electromagnet according to claim 1, wherein the thickness of each fin is not less than 4 mm and not more than 8 mm, and the width of each slit between the adjacent fins is not less than 2 mm and not more than 4 mm.

* * * * *